Patented Oct. 17, 1950

2,525,912

UNITED STATES PATENT OFFICE 2,525,912

HALOGEN-CONTAINING DERIVATIVES OF DICARBOXYLIC ACIDS AND METHOD FOR PRODUCING THEM

Morris S. Kharasch, Chicago, Ill., assignor to United States Rubber Company, New York, N. Y., a corporation of New Jersey No Drawing. Application October 25, 1947, Serial No. 782,218

4 Claims. (Cl. 260—485)

This invention relates to the synthesis of a new class of halogen containing organic compounds by the free radical initiated reaction between a dialkyl ester of an ethylene-$\alpha,\beta$-dicarboxylic acid, an olefinically unsaturated organic compound and a bromomethane.

Organic compounds containing olefinic unsaturation can be caused to react with trichlorobromomethane so as to form simple one to one adducts which contain in each molecule the constituent atoms from one and only one molecule of the olefinic compound and the constituent atoms from one and only one molecule of trichlorobromomethane. The methods of carrying out this reaction and the products obtained thereby are described more fully in my copending application Ser. No. 696,941, filed September 13, 1946, now Patent No. 2,468,208. I have now found that trichlorobromomethane can be caused to react with a dialkyl fumarate and a selected olefinic compound to form new and useful halogen containing organic compounds which belong to the class consisting of one-to-one-to-one adducts of trichlorobromomethane, the dialkyl fumarate and the selected olefinic compound and the dehydrobrominated derivatives of said adducts. The one-to-one-to-one adducts formed in accordance with my invention contain chemically combined in each molecule the constituent atoms from one and no more than one molecule of trichlorobromomethane, the constituent atoms from one and no more than one molecule of dialkyl fumarate and the constituent atoms from one and no more than one molecule of the selected olefinic compound. The dehydrobrominated derivatives of these adducts are olefinically unsaturated organic compounds which are $\alpha(3,3,3$-trichloropropyl) substituted $\alpha,\beta$-ethylene dicarboxylic acid esters in which the trichloropropyl radical may contain substituents in the 1 and 2 positions. Suitable ethylenically unsaturated olefinic compounds are those selected from the class consisting of ethylenic hydrocarbons and substituted ethylenic hydrocarbons in which the ethylenic double bond is not conjugated with a $>C=O$ or $-C\equiv N$ group.

The 1:1:1 adducts obtained by the practice of my invention could on the basis of general principles be assigned one of two equally probable structures, either:

I
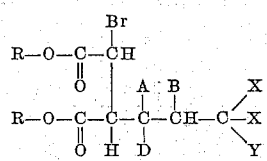

or

II
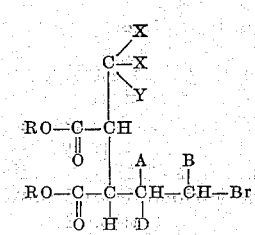

Experimentation has shown that the 1:1:1 adducts of the present invention have Structure I in which R is an alkyl hydrocarbon radical and the divalent radical —CDA—CHB— is derived from the ethylenic compound CDA=CHB in which A is a monovalent organic radical selected from the group consisting of hydrocarbon and substituted hydrocarbon radicals free of carbonyl double bonds and nitrile triple bonds conjugated with respect to the ethylenic double bond, B is a monovalent radical of the type $-(CH_2)_n-H$ where $n$ can be a number including zero which is less than the number of skeletal carbon atoms in the radical A, D is one of the monovalent radicals hydrogen and methyl, X is one of the halogens bromine, chlorine and fluorine and Y is one of the monovalent radicals —Cl, —F, —H, —C≡N,

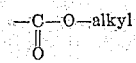

Experimentation has also shown that the dehydrobrominated derivatives of said adducts have the type formula

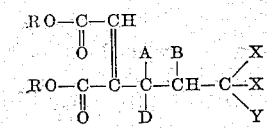

where R, A, B, D, X and Y are as previously defined.

This new class of compounds which can be prepared by the new process disclosed herein are useful intermediates in organic synthesis and in the production of dyes, pharmaceuticals, plasticizers, insecticides, and resins.

According to a preferred embodiment of my invention, I subject to the action of free radical reaction initiators a mixture containing approximately equimolar proportions of a dialkyl fumarate, trichlorobromomethane and an ethylenically unsaturated organic compound having the general formula ACD=CHB where A, B, and D are as previously defined, for a time and at a temperature sufficient to form a product having the formula

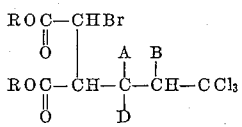

where A, B, D and R are as previously defined.

This product may be dehydrobrominated by heating in the presence or absence of known dehydrobromination agents such as alkali metal alcoholates to form a dehydrobrominated derivative of the class having the type formula

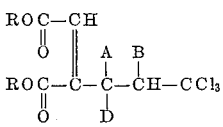

where A, B, D and R are as previously defined.

Suitable dialkyl fumarates are those of the lower aliphatic alcohols containing from 1 to 6 carbon atoms although esters of higher alcohols may be used. Exemplary of such alkyl fumarates are: dimethyl fumarate, diethyl fumarate, dipropyl fumarate, diisopropyl fumarate, di-n-butyl fumarate, diisobutyl fumarate, di tert. butyl fumarate, the various diamyl fumarates and the various dihexyl fumarates. Mixed types may be employed such as methyl ethyl fumarate, methyl isopropyl fumarate, methyl hexyl fumarate, ethyl isopropyl fumarate, etc.

I have found that dialkyl maleates or mixtures of dialkyl maleates and dialkyl fumarates can be used satisfactorily in the practice of my invention. Among the suitable dialkyl maleates are dimethyl maleate, diethyl maleate, dipropyl maleate, diisopropyl maleate, di-n-butyl maleate, diisobutyl maleate, di tert. butyl maleate, the various diamyl maleates and the various dihexyl maleates.

Among the ethylenically unsaturated organic compounds having the type formula CAD=CHB those in which B is hydrogen are preferred since they give somewhat better yields of the desired products. Exemplary of such compounds are: propene, butene-1, pentene-1, hexene-1, heptene-1, octene-1, butadiene, styrene, allyl chloride, methallyl chloride, allyl alkyl ethers, diallyl, allyl esters of saturated carboxylic acids, methallyl esters of saturated carboxylic acids, isobutylene, alkyl esters of vinyl acetic acid, alkyl esters of allyl acetic acid, and alkyl esters of undecylenic acid. The following olefinic compounds having the type formula CAD=CHB in which B is an alkyl hydrocarbon radical are suitable: hexene-3, butene-2, pentene-2, and alkyl esters of oleic acid.

The following examples are illustrative of my invention.

EXAMPLE 1

*Peroxide-induced reaction of bromotrichloromethane, dimethyl fumarate and octene-1*

A mixture containing dimethyl fumarate (72 g., 0.5 mole) and bromotrichloromethane (37.25 g., 0.19 mole) is heated to 75–85° C. and stirred in a three-necked flask. A solution of acetyl peroxide (0.3 g.) and bromotrichloromethane (37.25 g., .19 mole) in octene-1 (28 g., 0.25 mole) is dropped in over a period of four hours. After addition of the peroxide solution is complete, heating and stirring are maintained for one hour. Upon cooling, dimethyl fumarate (4.5 g.) crystallizes and is separated and washed with low-boiling ligroin. Bromotrichloromethane (22 g.) is recovered by distillation but no unreacted octene is obtained. Further distillation yields octene-bromotrichloromethane 1:1 addition product (49 g.) ($n_d^{20}$ 1.4930) distilling at 100–110° C. at .3 mm. and a viscous yellow oil (25.5 g.) distilling at 170–185° C. at .2 mm. with evolution of hydrogen bromide. The halogen analysis and molecular weight determination are consistent with methyl (3-carbomethoxy-4-hexyl-6,6,6-trichloro) hexenoate-2 VI.

Anal. Calc'd. for $C_{15}H_{23}O_4Cl_3$: Cl, 28.6. Found: Cl, 27.9.

Molecular Wt. Calcd. for $C_{15}H_{23}O_4Cl_3$: 373.5. Found: 372.0.

The reaction between bromotrichloromethane, dimethyl fumarate and octene-1 may therefore be considered to take place according to the following series of equations:

1. $$RC(=O)-O-O-C(=O)R \xrightarrow{heat} R\cdot + CO_2 + \cdot C(=O)-R$$

2. $$R\cdot + BrCCl_3 \longrightarrow RBr + \cdot CCl_3$$

2a. $$BrCCl_3 \xrightarrow{h\nu} \cdot Br + \cdot CCl_3$$

3. $$\cdot CCl_3 + CH_3(CH_2)_5CH=CH_2 \longrightarrow CH_3(CH_2)_5CHCH_2CCl_3$$
   I                                II 4. $$CH_3(CH_2)_5CHCH_2CCl_3 + \underset{III}{\overset{H}{\underset{H}{C}}=\overset{C-O-CH_3}{\underset{C=O}{\underset{|}{CH_3O}}}} \longrightarrow$$
   II $$\underset{IV}{CH_3(CH_2)_5CH-CH_2-CCl_3 \atop CH_3-O-C(=O)-CHCHC(=O)-O-CH_3}$$

5. $$\underset{IV}{CH_3(CH_2)_5CH-CH_2-CCl_3 \atop CH_3-O-C(=O)-CH-CH-C(=O)-OCH_3} + BrCCl_3 \longrightarrow$$

$$\underset{V}{CH_3(CH_2)_5CH-CH_2CCl_3 \atop CH_3O-C(=O)-CH-CH-C(=O)-O-CH_3 \atop \quad\quad Br} + \cdot CCl_3$$

6. $$\underset{V}{CH_3(CH_2)_5CH-CH_2-CCl_3 \atop CH_3O-C(=O)-CH-CH-C(=O)-OCH_3 \atop \quad\quad Br} \longrightarrow$$

$$\underset{VI}{CH_3(CH_2)_5-CH-CH_2-CCl_3 \atop CH_3O-C(=O)-C=CH-C(=O)-O-CH_3} + HBr$$

Equation 1 represents the generation of free radicals by the thermal decomposition of a diacyl peroxide. Equation 2 represents the generation of a free trichloro methyl radical by the reaction of a free alkyl type radical with trichlorobromomethane. Equation 3 represents the addition of a free trichloromethyl radical to an olefin I to form a trichloro substituted free secondary alkyl radical II. Equation 4 illustrates the addition of this trichloro substituted radical II to the ethylene double bond in the fumarate ester III to form an alkyl substituted dimethyl succinyl free radical IV which is capable as shown in Equation 5 of removing a bromine atom from trichlorobromo methane to form methyl (2-bromo-3-carbomethoxy-4-hexyl-6,6,6-trichloro) hexanoate V and generate a free trichloromethyl radical which can initiate the series of reaction represented by Equations 3, 4 and 5. Equation 6 illustrates the reaction whereby methyl (2-bromo-3-carbomethoxy-4-hexyl-6,6,6-trichloro) hexanoate V loses hydrogen bromide to form methyl (3-carbomethoxy-4-hexyl-6,6,6-trichloro) hexenoate-2 VI.

When the reaction is initiated by actinic light instead of Steps 1 and 2 we have Step 2a, but Steps 3, 4 and 5 are the same as for the peroxide initiated reactions. Therefore, it is clear that the essential course of the reaction and the products formed will be the same when any method of generating free radical is employed.

*Identification of 1:1:1 addition product of bromotrichloromethane, dimethyl fumarate and octene-1. (Methyl (2-bromo-3 carbomethoxy-4-hexyl-6,6,6-trichloro) hexanoate)*

The 1:1:1 addition product VI (4.0 g.) with hydrogen bromide removed is refluxed for five hours under nitrogen with a 4.5 mole ratio of sodium methylate in methanol after which the orthoester VII is decomposed with acetic acid and the mixture is diluted with water. Ether extraction yields an oil VIII (1.7 g.) distilling at 135–140° C. at .1 mm. Quantitative hydrogenation results in the absorption of 15.8 ml. of hydrogen (std. conditions) compared to a calculated 17.2 ml. for $C_{16}H_{26}O_6$.

A 7.4 g. sample of the unsaturated 1:1:1 addition product VI is dissolved in ethyl acetate and reacted with ozone at −72° C. The ethyl acetate is removed at room temperature and reduced pressure and the glassy ozonide is treated with water at room temperature for twenty-four hours and at 60° C. for four hours. The water layer is separated and treated with 10 ml. of 30% hydrogen peroxide solution for three hours at 40° C. The oxidized oil is refluxed for six hours in dilute hydrochloric acid. Upon evaporation of the water and hydrogen chloride, a light yellow solid (.3 g.) remains which is washed with ligroin and benzene. The solid XII gives a white precipitate with barium hydroxide and decolorizes acidic potassium permanganate. It reacts with p-toluidine, yielding a white solid XIII melting at 260–262° C. This solid does not depress the melting point of an authentic sample of the di-paratoluide of oxalic acid.

The water insoluble oil remaining after decomposition of the ozonide is separated, dried and fractionated giving a fluid oil (1.6 g.) distilling at 150–160° C. at .2 mm. and unchanged starting material (4.0 g.), distilling at 175–180° C. at .2 mm. The lower boiling fraction has a halogen analysis approximating methyl (2-keto-3-hexyl-5,5,5-trichloro) pentanoate X. No evidence is found of the presence of heptaldehyde in this oil.

Anal. Calcd. for $C_{12}H_{19}O_3Cl_3$: Cl, 33.6. Found: Cl, 30.8.

The following equations summarize the reactions involved in the identification of the product of Example 1:

7. 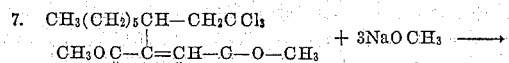
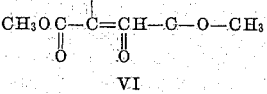
VI

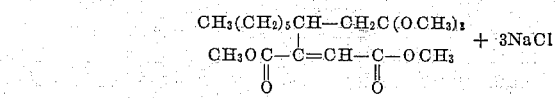
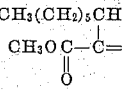

8. 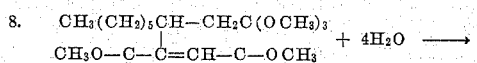
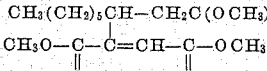
VII

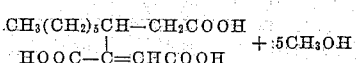
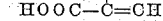
VIII

9. 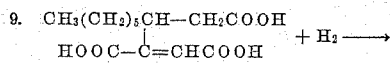
VIII

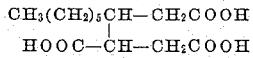
IX

10. 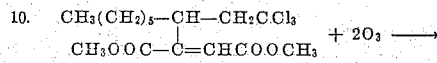
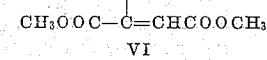
VI

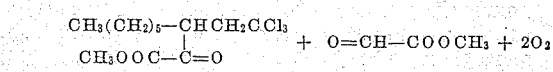
X   XI

11. 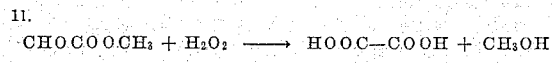
XI   XII

12. 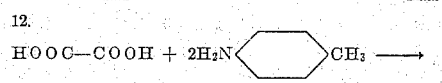
XII

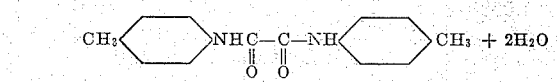
XIII

Equation 7 illustrates the formation of the orthoester VII by treating VI with sodium methylate. Equation 8 illustrates the hydrolysis of the orthoester VII to form the unsaturated tricarboxylic acid VIII. Equation 9 illustrates the hydrogenation of the unsaturated acid VII to give the saturated tricarboxylic acid IX. Equation 10 illustrates the ozonization of VI to form the fragments X and XI the identification of which establishes the location of the double bond in VI. Equation 11 illustrates the oxidation of methyl glyoxal XI and hydrolysis to oxalic acid XII. Equation 12 illustrates the formation of the para toluidide of oxalic acid XIII.

EXAMPLE 2

*Peroxide-induced 1:1:1 addition of butadiene, bromotrichloromethane and dimethyl fumarate*

Bromotrichloromethane (99 g., 0.5 mole) is placed in a metal pressure flask with dimethyl fumarate (72 g., 0.5 mole) and benzoyl peroxide (1 g.). The flask is placed on a shaking assembly and the neck is fitted with a gas introduction tube. The flask is heated to 80° C. and butadiene (20.5 g.–0.38 mole) is introduced over a period of three hours. The shaking and heating are maintained an additional hour.

Upon cooling solid dimethyl fumarate (46 g.) is separated and washed with low-boiling ligroin and the excess bromotrichloromethane (37 g.) is distilled at 100 mm. Further distillation yields butadiene-bromo-trichloromethane 1:1 addition product (18 g., 75–90° C./.3 mm.) and the Diels-Alder condensation product of butadiene and dimethyl fumarate (37 g., 90–99° C./.3 mm.). The black liquid residue (38 g.) is distilled in a Hickman still at 104 mm. and an oil bath temperature of 100–120° C. A colorless liquid (4.1 g., $n_d^{20}$ 1.5145) is collected. Hydrogen bromide is given off during the distillation. Sodium methylate in methanol is used to remove any remaining bromine in the molecule. The halogen analysis and molecular weight determinations are consistent with the 1:1:1 addition product of bromotrichloromethane, butadiene and dimethyl fumarate.

Anal. Calcd. for $C_{11}H_{13}O_4Cl_3$: Cl, 33.7. Found: Cl, 32.8.

Molec. Wgt. Calcd. for $C_{11}H_{13}O_4Cl_3$: 316.5. Found: 310.8.

EXAMPLE 3

*Peroxide-induced 1:1:1 addition of styrene, bromotrichloromethane and dimethyl fumarate*

Dimethyl fumarate (144 g., 1.0 mole), bromotrichloromethane (108 g.–0.55 mole) and styrene (6.5 g.–0.06 mole) stirred at 80–90° C. for four hours while a solution of bromotrichloromethane (25 g.–0.12 mole) styrene (19.5 g.–.19 mole) and benzoyl peroxide (0.5 g.) is dropped in through a nitrogen atmosphere. A large amount of the crystalline ester (128 g.) crystallizes on cooling and is separated and washed with low boiling ligroin. Unreacted bromotrichloromethane (87 g.) and styrene (11.5 g.) are also recovered. Further distillation yields the bromotrichloromethane-styrene 1:1 addition product (8.4 g.). The black residue (19.5 g.) is placed in the molecular still. A red-yellow glass (5.7 g. $n_d^{20}$ 1.5530) is collected at an oil bath temperature of 150–160° C. at 10–4 mm. Hydrogen bromide is split out. The halogen analysis and molecular weight determination are consistent with methyl (3 - carbomethoxy - 4 - phenyl - 6,6,6 - trichloro) hexenoate-2.

Anal. Calcd. for $C_{15}H_{15}O_4Cl_3$: Cl, 29.2. Found: Cl, 28.5.

Molec. Wgt. Calcd. for $C_{15}H_{15}O_4Cl_3$: 365.5. Found: 362.0.

EXAMPLE 4

*Peroxide-induced 1:1:1 addition of allyl chloride, bromotrichloromethane, and dimethyl fumarate*

Dimethyl maleate (126 g.–0.88 mole), dimethyl fumarate (18 g.–0.12 mole) and bromotrichloromethane (24.6 g.–0.125 mole) are heated at 75–85° C. with stirring during the addition of a solution of allyl chloride (19.2 g., 0.25 mole) and benzoyl peroxide (1.7 g.) in bromotrichloromethane (24.6 g.–0.125 mole) over a period of four hours. Upon cooling, dimethyl fumarate (9.6 g.) crystallizes and is separated. Further distillation yields a small amount of bromotrichloromethane-allyl chloride 1:1 addition product. The high-boiling residue (61 g.) is distilled from a Hickman still at 104 mm. and an oil bath temperature of 90–110° C. yielding 32 g. of a viscous oil.

This oil, after complete removal of the bromine with sodium methylate, gives a halogen analysis and molecular weight consistent with methyl (3 - carbomethoxy - 4 - chloromethyl - 6,6,6 - trichloro) hexenoate-2.

Anal. Calcd. for $C_{10}H_{12}O_4Cl_4$: Cl, 42.0. Found: Cl, 40.7.

Molec. Wgt. Calcd. for $C_{10}H_{12}O_4Cl_4$: 338. Found: 341.8.

*Photochemical-induced 1:1:1 addition of propylene, bromotrichloromethane and dimethyl fumarate*

Dimethyl fumarate (48 g., 0.38 mole) and bromotrichloromethane (99 g., 0.5 mole) are internally irradiated with a mercury vapor-neon coil at 60° C. for twenty-four hours while propylene is bubbled through the solution. The work-up of the reaction mixture yields 19 g. of unchanged ester and 28.1 g. of bromotrichloromethane-propylene 1:1 addition product distilling at 75–85° C. at 15 mm. By distillation at .1 mm., the 1:1 addition product of dimethyl fumarate and bromotrichloromethane (24.2 g.) and the 2:1 addition product of the fumarate ester and bromotrichloromethane (8.1 g.) are obtained as well as a yellow viscous oil (7.3 g., 115–125° C. at .1 mm.) which gives a halogen analysis and molecular weight determination consistent with the 1:1:1 addition product with hydrogen bromide split out.

Anal. Calcd. for $C_{10}H_{13}O_4Cl_3$: Cl, 35.9. Found: 34.3.

Molec. Wgt. Calcd. for $C_{10}H_{13}O_4Cl_3$: 303.5. Found: 303.0.

EXAMPLE 5

*Identification of 1:1:1 addition products of dimethyl fumarate and bromotrichloromethane with butadiene, styrene, allyl chloride and propylene*

The unsaturated 1:1:1 addition compounds formed by reacting butadiene, styrene or propylene with the fumarate ester and bromotrichlormethane are refluxed with a 4.5:1 mole ratio of sodium methylate in methanol under nitrogen. In the case of the allyl chloride unsaturated 1:1:1 product, a 5.5:1 mole ratio is used. The ortho-esters are decomposed with acetic acid and the water-diluted solutions extracted with ether. The oily extracts are distilled, the boiling ranges being 115–120° C./1 mm. for the butadiene, 150–160° C./.1 mm. for the propylene 1:1:1 addition product derivatives, respectively.

Quantitative catalytic hydrogenation shows the butadiene 1:1:1 derivative absorbing 21.2 ml. of hydrogen (26.5 ml., calc.), the styrene 1:1:1 derivative absorbing 17.2 ml. (17.1 ml. calc.), the allyl chloride 1:1:1 derivative absorbing 13.9 ml. (15.4 ml., calc.) and the propylene 1:1:1 derivative absorbing 20.5 ml. (23.7 ml., calc.).

I claim:

1. In a process of producing halogen containing organic compounds of the class consisting of the one to one to one adducts of trichlorobromomethane with a dialkyl ester of one of the ethylene alpha, beta-dicarboxylic acids maleic and fumaric and an ethylenic organic compound from the class consisting of octene-1, butadiene, styrene, propylene, and allyl chloride; and the dehydrobrominated derivatives of said adducts, the step of subjecting a reaction mixture containing the trichlorobromomethane, a dialkyl ester of one of the ethylene alpha, beta-dicarboxylic acids maleic and fumaric and an ethylenic compound from the class consisting of octene-1, butadiene, styrene, propylene, and allyl chloride, to the action of a free radical reaction initiator of the class consisting of actinic light and peroxidic polymerization catalysts.

2. The dehydrobrominated 1:1:1 adduct of trichlorobromomethane, a dialkyl fumarate and an ethylenic hydrocarbon having a terminal

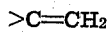

group said product having the type formula

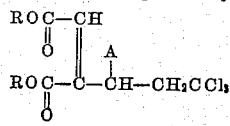

wherein R is a saturated aliphatic hydrocarbon radical containing from one to six carbon atoms and A is a monovalent hydrocarbon radical selected from the class consisting of hexyl, vinyl, phenyl, methyl, and chloromethyl.

3. The compound methyl (3-carbomethoxy-4-hexyl-6,6,6-trichloro) hexenoate-2.

4. The compound methyl (3-carbomethoxy-4-phenyl-6,6,6-trichloro) hexenoate-2.

MORRIS S. KHARASCH.

No references cited.